L. L. KNOX.
WATER COOLING SYSTEM FOR FURNACES.
APPLICATION FILED FEB. 4, 1918.

1,273,234.

Patented July 23, 1918.
4 SHEETS—SHEET 1.

WITNESSES

INVENTOR

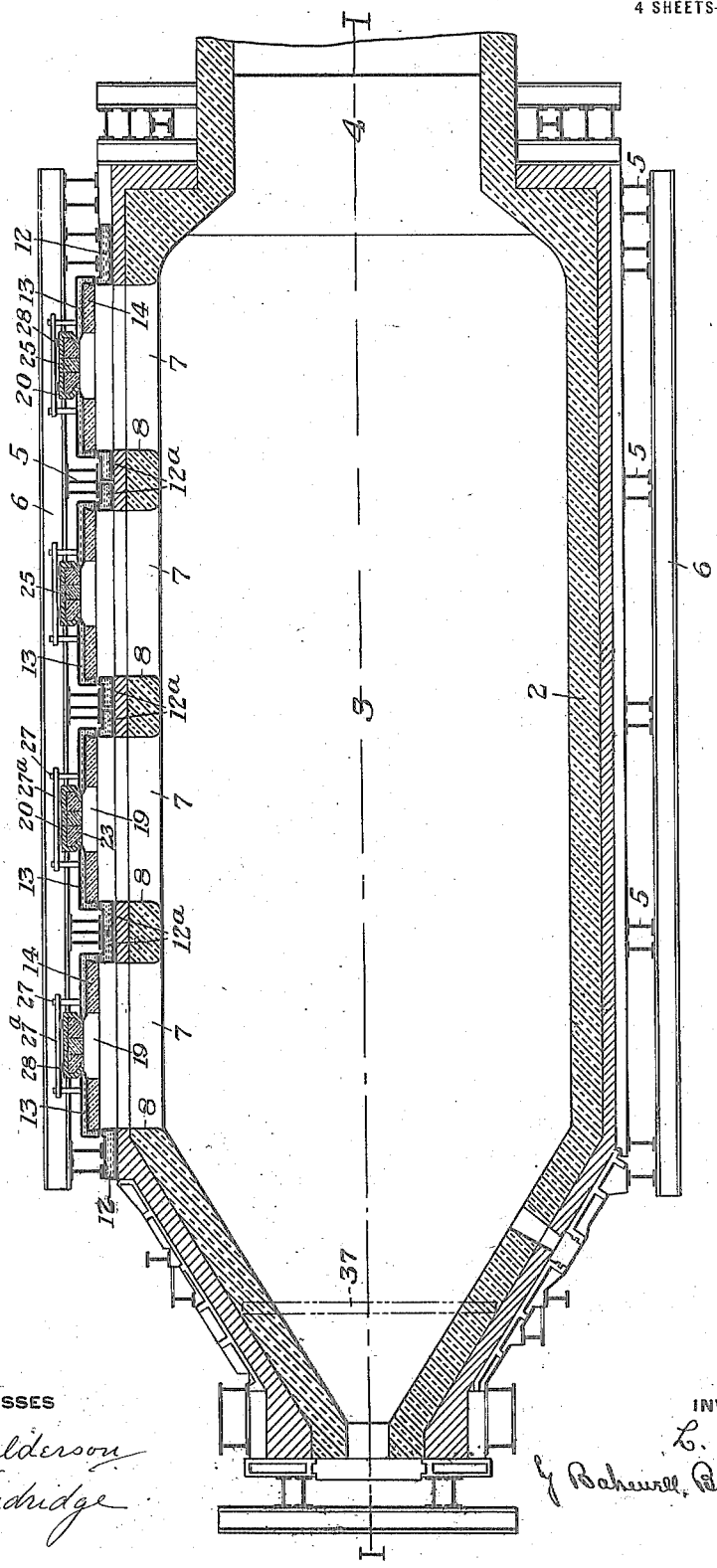

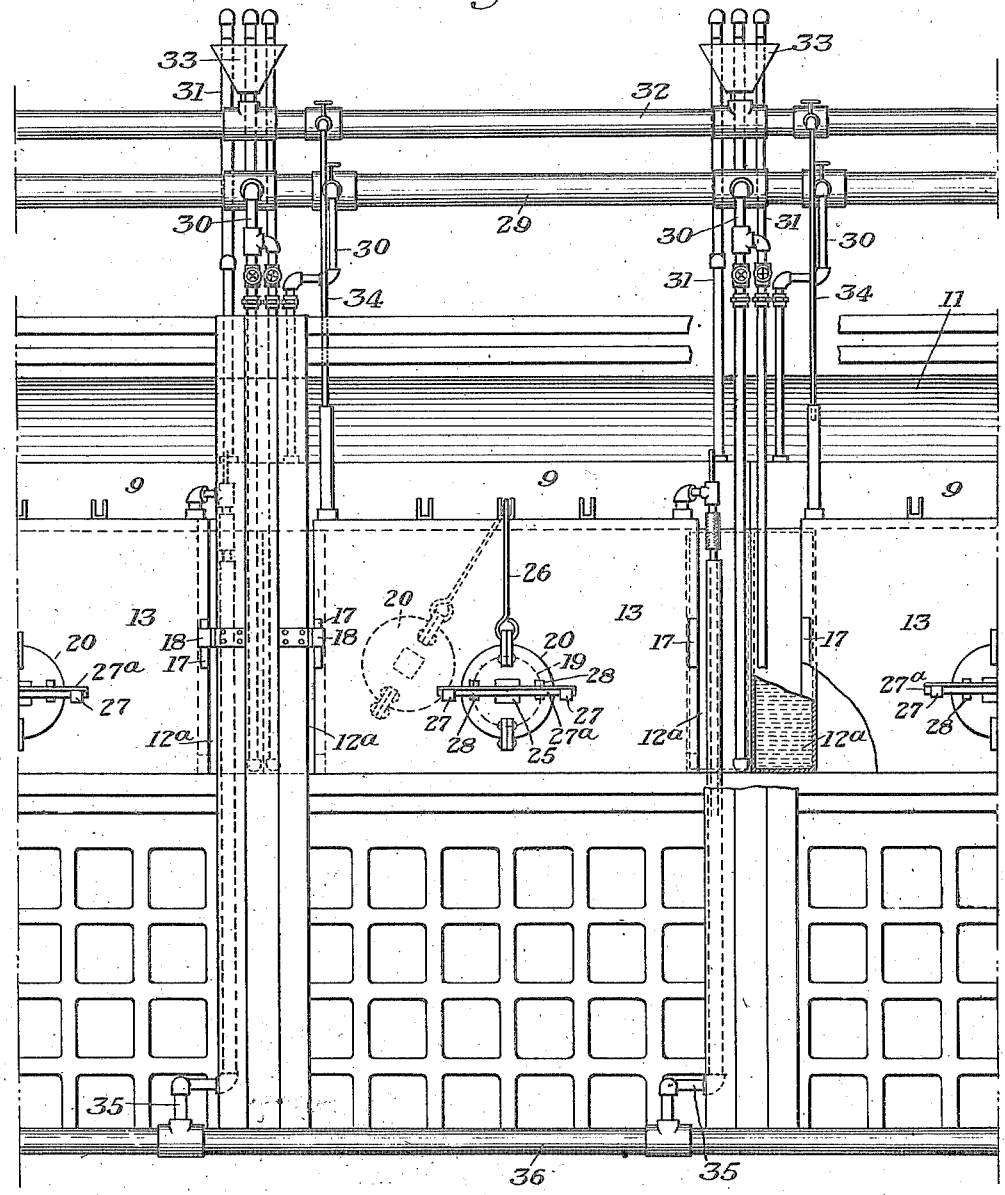

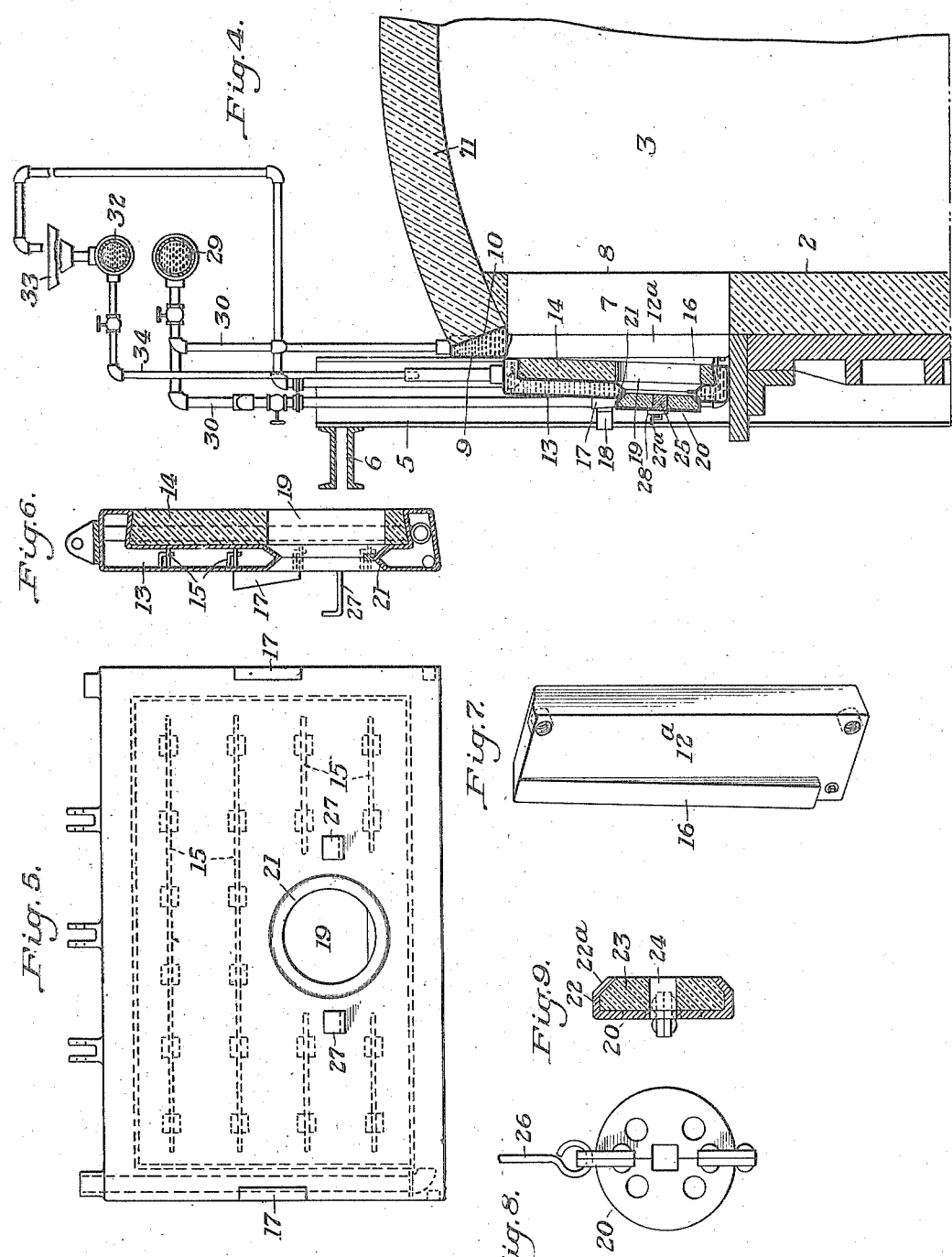

To all whom it may concern:

Be it known that I, LUTHER L. KNOX, a resident of Bellevue, Allegheny county, Pennsylvania, have invented a new and useful Improvement in Water-Cooling Systems for Furnaces, of which the following is a full, clear, and exact description, reference being had to the accompanying drawings, forming part of this specification, in which—

Fig. 2 is a horizontal section of the same the section being taken upon the line II—II of Fig. 1.

Fig. 3 is a side elevation of a portion of the furnace;

Fig. 4 is a partial transverse vertical section;

Fig. 5 is a plan view of one of the doors;

Fig. 6 is a transverse vertical section of the door;

Fig. 7 is a perspective view of one of the jamb coolers;

Fig. 8 is a plan view; and

Fig. 9 is a transverse section of one of the hole covers.

Figure 1:
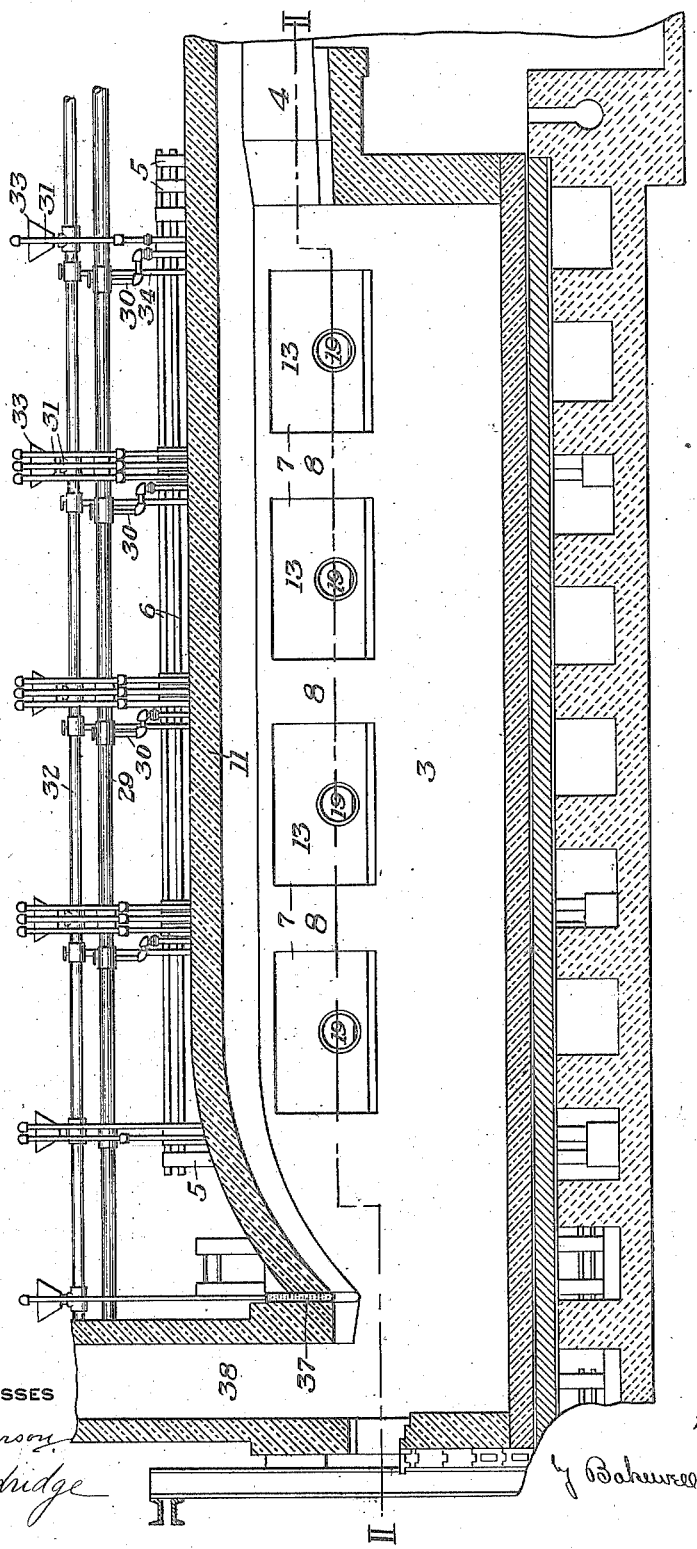
Figure 1 is a longitudinal vertical section of a portion of a furnace embodying my invention the section being taken on the line I—I of Fig. 2.

My invention has relation to cooling systems for furnaces; and more particularly to means for cooling the side walls of a reverberatory furnace, such as a heating or metal-refining furnace, in which the wall is provided with a plurality of door openings.

The object of my invention is to provide means of effective character, whereby the parts of the side wall of a furnace of the above recited character adjacent the door openings may be thoroughly protected by water cooling, the protected parts comprising the jamb and mantel portions of the masonry walls adjacent to and between the door openings, and also the doors. A further object of the invention is to so arrange the cooling members that any defective member may be readily removed and replaced with a minimum disturbance of the other parts of the structure.

The particular nature of my invention will be best understood by reference to the accompanying drawings, in which I have shown my invention applied to a reverberatory furnace of a well known type employed in the refining of copper, and which will now be described, it being premised, however, that the invention is applicable to various other furnaces and that numerous changes may be made in the details of construction and arrangement of the parts without departing from the spirit and scope of the invention as defined in the appended claims.

In these drawings, the numeral 2 designates the masonry wall of the hearth portion 3 of the furnace, the heating medium being introduced into the furnace through the passage or flue 4. The masonry wall is supported by a metallic frame consisting mainly of the vertical buck-stays 5 and the horizontal binders 6.

One of the side walls of the chamber 3 is provided with a plurality of adjacent door openings 7, arranged side by side, and separated from each other by intervening jamb portions 8. This wall of the furnace is peculiarly subject to the destructive action of heat, and my invention relates mainly to the cooling means employed for this side wall.

In accordance with my invention, I provide hollow water-cooled mantel members 9, which extend longitudinally across the top of the door openings 7, these members having the inner inclined surfaces 10, whereby the members act as skew-backs to support the arch 11 of the furnace roof. These members are formed in sections, placed end to end, and are inserted behind the vertical buck-stays 5, their end portions resting upon the vertical jamb coolers. These jamb coolers (one of which is shown in perspective in Fig. 7) seat against the outer faces of the jamb portions 8, behind the adjacent buck-stays 5. Each of the end jamb coolers 12 consists of a single hollow box-like member, while each of the intermediate jamb coolers consists of two sections $12^a$, arranged side by side against the outer face of each chamber wall. The purpose in making each of these intermediate jamb coolers in two separate sections is to permit any one of them to be readily removed, when necessary, by moving it bodily into and then out through the door openings. In this manner, any defective coolers can be readily removed and replaced with a minimum disturbance of the adjacent members of the structure.

The numeral 13 designates doors, which are of hollow water-cooled form, such as clearly shown in Figs. 2, 4, 5 and 6, the inner or seating face of each door being inset at its central portion to seat a refractory lining 14. This door structure may be provided with any suitable interior system of bracing, such as that indicated at 15.

The doors seat against the outer faces of the jamb coolers and against the lower outer portions of the mantel members 9. I prefer to cause the doors to seat in an inclined position, as indicated in Fig. 4, so that the action of their weight will cause them to hug more closely their seats. For this purpose, I provide the jamb coolers with wedge portions 16, at the lateral edges thereof, these wedge portions increasing in thickness from the top downwardly. As the doors move downwardly on these portions 16, which form the seats for the lateral edge portions of the doors, the latter are forced into the inclined position shown in Fig. 4. The doors may be further caused to engage their seats closely by means of the wedge projections 17 thereon, and which are adapted to engage bearing members 18, secured to or seated on the frame of the furnace. As the doors are lowered to their seats, these wedge members 17 ride behind the members 18, and are thereby firmly wedged in their closed seated positions. Any suitable or usual means (not shown) may be employed for raising and lowering the doors.

Each door is preferably provided with a poke-hole 19, extending therethrough and normally closed by a swinging cover 20. To form this poke-hole, the plates or sheets from which the door is made are cut out, and the edges thereof shaped and welded together to form the double beveled peripheral wall 21. The door 20 has an inwardly extending surrounding flange portion 22, which is shaped to seat and retain a refractory lining 23, and the cover and lining are formed with a central opening 24, which may be normally closed by a removable refractory brick or block 25. The door cover is preferably suspended from the upper portion of the doors by suitable link members 26, so as to permit the cover member to be swung back to a position such as shown in dotted lines in Fig. 3. It may be retained in this position by engagement with one of two keepers 27. These two keepers are arranged one on either side of the poke-hole opening 19, and are designed to receive a suitable bar 27ª, by which the cover may be normally held in its closed position. Wedges 28 may be driven behind this bar, as shown in Fig. 3, in order to force the covers closely to their seats. The flange 22 of each cover has a beveled surface 22ª, adapted to fit in the outer bevel on the peripheral wall of the opening 19, thus making a relatively tight joint with the door.

The mantel coolers, the jamb coolers and the doors are all preferably formed from sheet metal; all joints therein being welded, thereby making structures which are sufficiently elastic to permit of expansion and contraction movements, and free from rivets or other joints of a character likely to cause leakage. Any suitable water supply and circulating connections may be provided for these water-cooled doors. In the arrangement shown in the drawings, a water supply pipe 29 is extended longitudinally above the furnace, and is connected by a pipe 30, with each of the jamb and mantel coolers. A return pipe 31 leads from each of these members to a hot water escape pipe 32, arranged adjacent to the pipe 29. Preferably the pipes 31 discharge into the pipes 32 through the medium of open-top funnels 33, which permit of the escape of any steam which may be present. While the doors may also be supplied with water from the pipe 29, I have shown them as getting their supply of water by means of connections 34 with the hot water pipe 32. That is to say, a portion of the water which has already circulated through the cooling members is taken from the pipe 32 and circulated through the doors, passing thence downwardly through the outlet connections 35 to an offtake pipe 36. The pipe connections 34 and 35 have telescoping sections to permit of the opening and closing of the doors.

As will be seen by reference to Fig. 3, I prefer to locate as many of the water-circulating connections as possible behind the buck-stays 5, where they are out of the way and are also protected against injury.

The numeral 37 designates a hollow rigid roof cooler which is inserted (as shown in Figs. 1 and 2) where the roof 11 joins the wall of the uptake flue 38, leading from the furnace chamber 3.

My invention as will appear from the foregoing description provides for a thoroughly effective cooling of those portions of the side wall of the furnace which are most subject to the destructive action of the heat, the cooling members being so arranged that each has its own water-circulating connections and can be removed and replaced without materially disturbing the system as a whole.

I claim:

1. The combination with a furnace having a side wall provided with a plurality of door openings with jamb portions between said door openings, said jamb portions comprising brick work and also frame members, and there being openings between the brick-work and the frame members, of hollow cooling members seated in said openings against the outer sides of the brick-work portion of said jamb portions; said members being removable separately by moving them laterally toward the said openings, substantially as described.

2. The combination with a furnace having its side wall provided with a plurality of door openings therein and with metallic frame members adjacent to said openings, said side wall having jamb portions between said openings, and hollow cooling members seated against the outer sides of said jamb portions behind said frame members, said members being removable separately by moving them laterally toward the door openings, substantially as described.

3. The combination with a furnace having a side wall provided with a plurality of door openings therein with jamb portions between said openings, said jamb portions having brick-work columns of hollow cooling boxes seated against the outer sides of said jamb portions, the cooling members for the intermediate columns being formed in two sections, the two sections together covering the width of one of said columns together with means for normally holding said boxes against the columns, substantially as described.

4. A furnace having a side wall formed with a plurality of adjacent spaced door openings with intervening brick work columns, hollow cooling members seating against and substantially covering the outer faces of said columns, other hollow cooling members placed end to end above said openings and extending horizontally of the furnace, the two sets of cooling members having door seating and guiding surfaces, and a plurality of water-cooled doors, the furnace also having frame portions which hold the cooling members in place, and said cooling members and doors forming a practically continuous water-cooled jacket for the door area of that wall of the furnace, substantially as described.

5. The combination with a furnace having a side wall provided with a plurality of door openings with jamb portions between said openings, of hollow cooling members removably seated against the outer sides of said jamb portions, and other hollow cooling members extending across the top of said openings and seating upon the upper ends of the first named members, the furnace having frame members behind which the said cooling members are removably seated, substantially as described.

6. The combination with a furnace having a side wall provided with a plurality of door openings therein with jamb portions between said openings, and vertical buck-stays extending outside of said jamb portions and separated therefrom, of hollow water-cooled jamb and mantel members seated behind the buck-stays and removably secured thereby, substantially as described.

7. The combination with a furnace having a side wall provided with a plurality of door openings therein with jamb portions between said openings, and vertical buck-stays extending outside of said jamb portions and separated therefrom, of hollow water-cooled jamb and mantel members seated behind the buck-stays and removably secured thereby, together with water-circulating connections for said members, said connections lying in part between the furnace and said buck-stays, substantially as described.

8. The combination with a furnace having a side door provided with a plurality of door openings with jamb portions between said openings, of hollow jamb coolers seated against the outer sides of said jamb portions, and hollow water-cooled doors closing said openings and seating against said jamb coolers, the jamb coolers having downward and outwardly inclined door-seating portions together with means whereby as the doors are lowered to closed positions they are wedged inwardly against said seating portions, substantially as described.

9. In a cooling system for furnaces, a hollow water-cooled door having an opening therefrom formed with a beveled seating wall, and a cover member having an inwardly extending flange formed with a beveled portion to fit said seating wall together with means for normally holding the cover member in place, substantially as described.

10. In a furnace-cooling system, the combination with jamb coolers located at opposite sides of door-openings of the furnace, said jamb coolers having wedge-shaped door-seating portions, of hollow water-cooled doors seating on said wedge portions, and wedging means for forcing the doors to their seats as they are moved to closed position, substantially as described.

In testimony whereof, I have hereunto set my hand.

LUTHER L. KNOX.